United States Patent [19]
Thompson, Jr.

[11] Patent Number: 5,687,563
[45] Date of Patent: Nov. 18, 1997

[54] MULTI-SPOOL TURBOFAN ENGINE WITH TURBINE BLEED

[75] Inventor: Robert S. Thompson, Jr., Brighton, Mich.

[73] Assignee: Williams International Corporation, Walled Lake, Mich.

[21] Appl. No.: 589,649

[22] Filed: Jan. 22, 1996

[51] Int. Cl.$^6$ .............................. F02C 9/18; F02K 3/075
[52] U.S. Cl. .................................. 60/226.3; 60/39.17
[58] Field of Search .................... 60/39.161, 39.17, 60/39.25, 226.1, 226.3

[56] References Cited

U.S. PATENT DOCUMENTS

| | | | |
|---|---|---|---|
| 2,529,973 | 11/1950 | Sedille et al. | 60/39.161 |
| 2,602,292 | 7/1952 | Buskland ey al. | 60/39.75 |
| 2,929,206 | 3/1960 | Daveport | 60/39.14 |
| 2,943,815 | 7/1960 | Besson | 244/14 |
| 3,363,415 | 1/1968 | Williams | 60/39.51 |
| 3,601,983 | 8/1971 | Guillot | 60/39.25 |
| 5,485,717 | 1/1996 | Williams | 60/39.03 |

*Primary Examiner*—Louis J. Casaregola

[57] ABSTRACT

A multi-spool turbofan engine has a plurality of circumferentially spaced poppet valves with diverters secured thereto for precisely controlling bleed of combustion gas aft of the high pressure turbine whereby the high pressure spool operates at high idle RPM so as to power accessories and the low pressure spool operates at low RPM so as to minimize noise and fuel consumption.

2 Claims, 2 Drawing Sheets

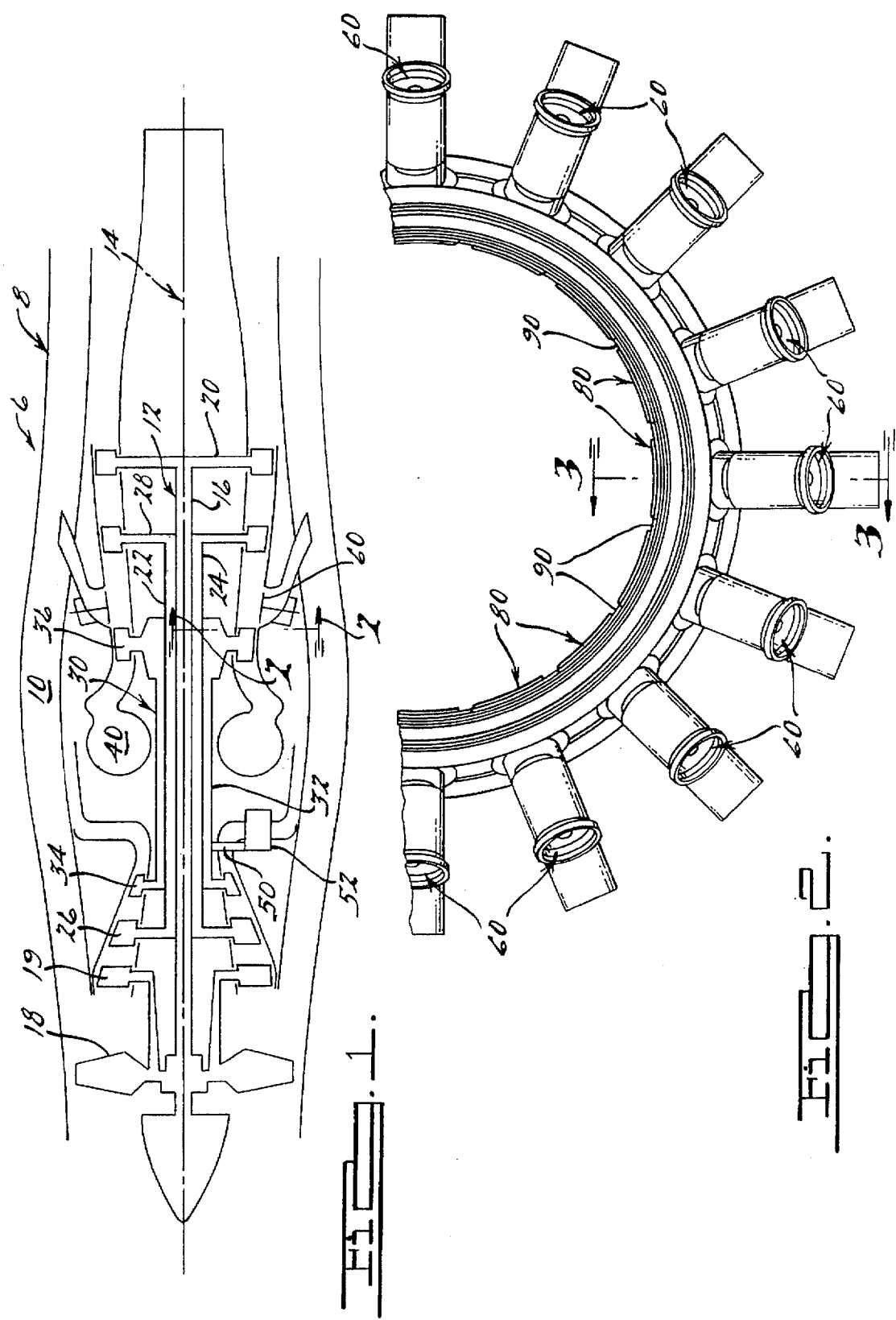

MULTI-SPOOL TURBOFAN ENGINE WITH TURBINE BLEED

BACKGROUND OF THE INVENTION

The present invention relates generally to gas turbine engines and more particularly to a multi-spool by-pass turbofan engine capable of serving as a highly efficient auxiliary power unit as well as the main power plant of a jet aircraft.

A modern jet aircraft requires substantial electric power to drive the many accessories required to support ground operation of the aircraft, particularly when the aircraft is parked at the ramp. Normally, power for such accessories is supplied by ground support equipment or by an onboard Auxiliary Power Unit (APU) to avoid the significant fuel consumption, noise, and general disturbance associated with operation of a propulsion engine. While affording maximum flexibility, onboard APU's have a negative impact on pay load and usable cube of the aircraft. Ground based support equipment is often unavailable.

Jet engines have heretofore been modified to solve this problem. For example, the twin spool by-pass turbofan engine disclosed in copending application Ser. No. 08/267,616, now U.S. Pat. No. 5,485,717, and assigned to the assignee of the instant invention, comprises a low pressure spool having a fan at a forward end and a low pressure turbine at the aft end thereof. A coaxial high pressure spool has a high pressure compressor in fluid flow communication behind the fan on the low pressure spool and a high pressure turbine in fluid flow communication behind a combustor and forward of the low pressure turbine on the low pressure spool. Combustion gas is bled into the by-pass duct of the engine from a point upstream of the low pressure turbine thereby to attenuate the speed of the fan.

However, the problem is more difficult when the concept is applied to a three-spool jet engine. Separation of the aerodynamic elements of a by-pass turbofan into three spools permits the speeds of the various spools to adjust themselves in an advantageous manner for off-design operating points. This is particularly true when the overall compression ratio is designed to be relatively high so as to provide the best possible fuel economy and thrust/weight ratio for propulsion purposes. Analysis shows that the speed of the low pressure spool decreases to a greater extent than that of the high pressure spool when the thrust demand is reduced. The lower speed of the low pressure compressors permits them to operate at lower flow rates without encountering compressor stall. However, optimum performance under all accessory load conditions requires finely calibrated interstage bleed of the high pressure combustion gases.

In the three spool configuration, an intermediate pressure compressor is generally supported on an intermediate spool downstream of the fan and forwardly of the high pressure compressor. The intermediate spool is driven by an intermediate pressure turbine that is disposed between the high and low pressure turbines. The fan on the low pressure spool is generally aligned with an annular by-pass duct that surrounds the high, intermediate, and low pressure spools. Engine accessories including, for example, a generator, are driven by the high pressure spool. Thus, it is important to maximize the RPM of the high pressure spool while minimizing the RPM of the low pressure spool.

SUMMARY OF THE INVENTION

The present invention permits a three spool by-pass turbofan propulsion engine to be operated in a programmable finely calibrated benign mode which minimizes fuel consumption and disturbance to personnel on the ramp by developing only the amount of engine power necessary to provide the electrical power, hydraulic power, and compressed air required for the immediate needs of the aircraft.

The concept of the present invention involves the provision of an efficient and precisely controllable hot gas bleed by utilizing both mechanical diverters disposed downstream of the high pressure turbine and upstream of the intermediate pressure turbine and poppet valves for controlling the diversion as well as flow induced by the pressure differential between the hot gas flow between the turbines and flow in the by-pass duct. The bleed-off gas is discharged into the engine by-pass duct without doing any further work. Removal of a substantial portion of the working fluid from flow through the intermediate and low pressure turbines drastically reduces their capacity to power the intermediate compressor and low pressure fan, respectively, thereby reducing both the pressure and temperature of air introduced into the high pressure compressor. Reduced pressure to the high pressure compressor reduces the mass flow therethrough and to the engine combustor which reduces the required fuel flow while still permitting the high pressure spool to operate at a speed sufficient to drive the engine generator, pumps, etc. Moreover, the reduced high pressure compressor inlet temperature resulting from lower pressures at an inlet thereto reduces the high pressure compressor outlet temperature which, in turn, reduces, or eliminates, the need to cool the air extracted from the high pressure compressor before it can be used as bleed air.

More specifically, in accordance with the present invention, a circumferentially spaced array of poppet valves, each having a mechanical flow diverter coupled thereto, is disposed downstream of the high pressure turbine to effect bleed of combustion gas. Use of multiple, highly efficient individually controlled poppet valves permits computer control of the amount of combustion gas bleed. Accordingly, bleed can be varied in discreet, precise increments by opening the valves in a programmed sequence. Controlled bleed permits the low pressure turbine to operate at a speed sufficient to supply only that amount of air to the high pressure section of the engine necessary to supply the amount of power required by on board electrical, hydraulic or pneumatic equipment of the aircraft.

It is to be noted that the broad concept of venting interstage pressure from a point immediately aft of the high pressure turbine into the by-pass duct of the engine when the engine is in the idle condition is disclosed in Williams U.S. Pat. No. 3,363,415, assigned to the assignee of the present invention. However, said patent is silent as to venting in a manner that is highly efficient and susceptible of digitized computer control so as to minimize fuel consumption while providing power as necessary to drive accessories at engine idle.

BRIEF DESCRIPTION OF THE DRAWINGS

FIG. 1 is a diagrammatic cross-sectional elevation of a three spool turbofan gas turbine engine to which the present invention has particular application;

FIG. 2 is a view taken along the line 2—2 of FIG. 1;

DETAILED DESCRIPTION OF THE PREFERRED EMBODIMENT(S)

Figure 3:
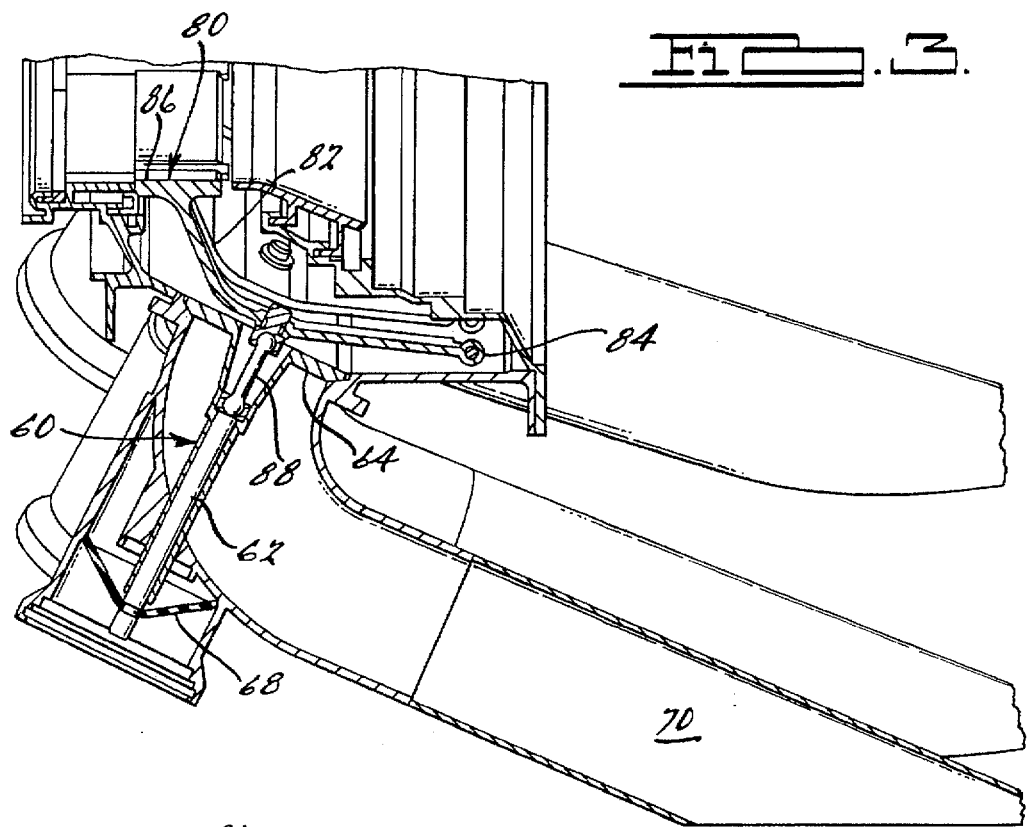
FIG. 3 is a view taken along the line 3—3 of FIG. 2.

As seen in FIG. 1 of the drawings, a three spool by-pass turbofan engine 6 is shown diagrammatically and comprises a cylindrical housing 8 the outer extremity of which defines the outer wall of an annular by-pass duct 10. A low pressure spool assembly 12, is rotatable about a central longitudinal axis 14 of the engine 6 and comprises a shaft 16 having a fan 18 and low pressure compressor 19 at the forward end thereof and a low pressure turbine 20 at the aft end thereof.

An intermediate pressure spool 22 is coaxially disposed about the aft 16 of the low pressure spool 12, and comprises a shaft 24, an intermediate compressor 26 and an intermediate turbine 28.

A high pressure spool assembly 30 is telescoped over the shafts 16 and 24 of the low and intermediate pressure spools 12 and 22, respectively, and comprises a shaft 32, a high pressure compressor 34 at the forward end thereof and a high pressure turbine 36 at the aft end thereof.

An annular combustor 40 is disposed about the low, intermediate, and high pressure spools 12, 22 and 30, respectively, between the high pressure compressor 34 and high pressure turbine 36.

An accessory drive shaft 50 is geared to the shaft 32 of the high pressure spool 30. Conventional accessories, for example, a starter/generator 52, are driven by the accessory drive shaft 50 at an RPM directly related to the RPM of the high pressure spool 30.

A portion of the air induced by the fan 18 flows to the low pressure compressor 19 thence to the intermediate and high pressure compressors 26 and 34, respectively, and a portion flows to the by-pass duct 10. Combustion air flows from the exit of the high pressure compressor 34 to the combustor 40 wherein fuel is introduced and burned. Combustion gases first pass through the high pressure turbine 36, thence through the intermediate and low pressure turbines 28 and 20, respectively.

When the engine 6 is operated on the ground and in the idle condition, accessory power is maximized while noise and fuel consumption is minimized by splitting the hot gas stream exiting the high pressure turbine 36. A portion of the hot gas is first diverted radially outwardly and then flows through one or more poppet valves 60 immediately aft of the high pressure turbine 36. The poppet valves 60 are disposed in a circumferentially spaced array and can be individually or concomitantly opened pneumatically under the control of a computer. Each poppet valve comprises a stem 62 and valve head 64 which is adapted to be seated on a valve seat 66. A pneumatic diaphragm 68 is responsive to a pressure differential thereacross to control each valve 60. A tailpipe 70 extends aft of each valve 60 into the by-pass duct 10.

As seen in FIG. 3, and in accordance with one feature of the present invention, a plurality of diverters 80 are controlled by the valves 60, respectively. Each diverter 80 comprises a lever arm 82 that is rotatable about a pivot 84. The lever arm 82 has a deflector plate 86 at the radially inner end thereof that extends into the hot gas flow stream exiting the high pressure turbine 36 when its associated poppet valve 60 is open. The lever arm 82 is connected to the valve stem 62 of the valve 60 by an articulated link 88. The diverter 80 augments bleed of hot gas over that produced by the pressure differential between the hot gas flow stream and the relatively lower pressure in the by-pass duct 10.

Figure 4:
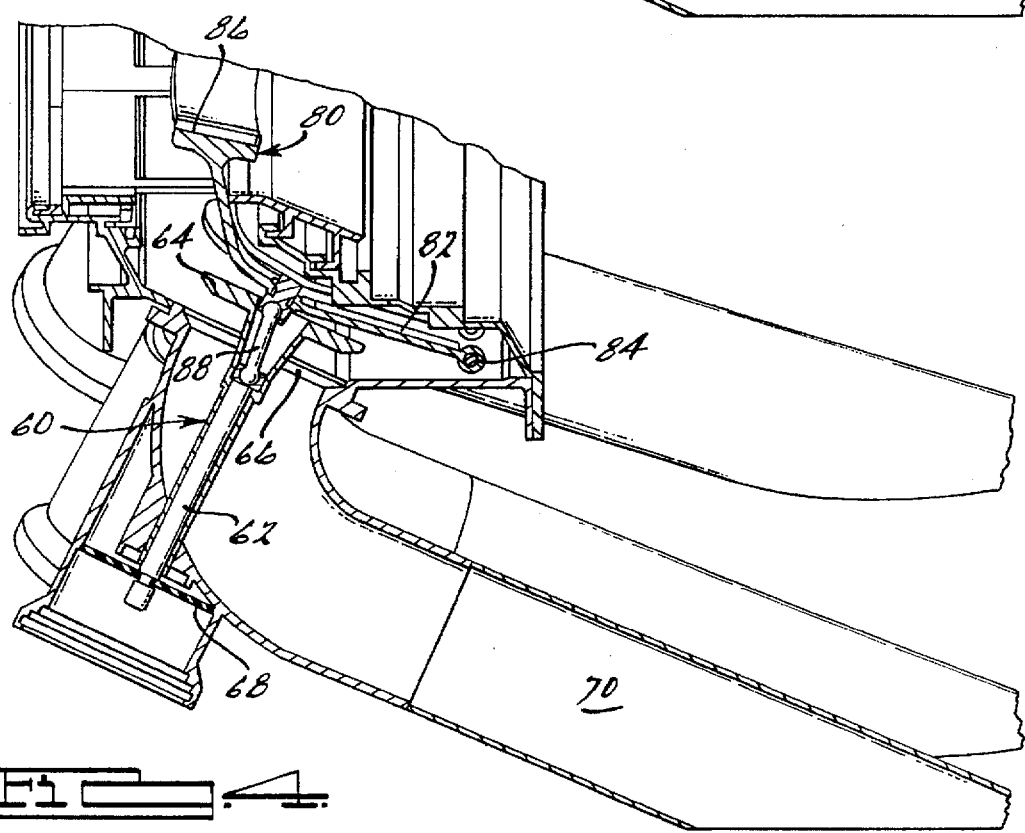
FIG. 4 is a view similar to FIG. 3 with the poppet valve and diverter in the open condition.

As seen in FIG. 4, the poppet valve 60 and diverter 80 have been biased to the open condition by the pneumatic diaphragm 68 under the control of a conventional computer (not shown).

In operation of the engine 6 in the full thrust condition, the poppet valves 60 are closed and the diverters 80 are retracted, the deflector plates 86 of the diverters 80 becoming part of the outer wall of the annular hot gas passage to the intermediate turbine 28. The diverter 80 is held in this position by tension in the link 86 between the stem 62 of the poppet valve 60 and the arm 82 of the diverter 80. When the poppet valve 60 opens, it pushes the diverter 80 into the flow annulus. This action leaves an opening in the outer wall of the flow annulus through which hot gas is diverted to and through the open poppet valve 60 to the engine by-pass duct 10. Intrusion of each diverter 80 into the hot gas flow annulus directs the hot gas toward its associated poppet valve opening and partially blocks the hot gas flow path to the intermediate pressure turbine 28 downstream thereof.

The moveable poppet valves 60 lie in spaced relation in the normal engine (retracted) mode thereby to provide a small fixed section 88 of outer wall between each of the diverters 80 to prevent the deflector plates 86 thereof from interfering with each other as they move radially inwardly into the hot gas duct. The amount of flow diversion in the APU mode can be adjusted to an optimum value by controlling radial intrusion of each diverter 80 by control of the stroke of the poppet valves 60 or by selective opening of the poppet valves 60.

While the preferred embodiment of the invention has been disclosed, it should be appreciated that the invention is susceptible of modification without departing from the scope of the following claims.

I claim:

1. In a multi-spool by-pass turbofan engine comprising a low pressure spool having a fan at a forward end and a low pressure turbine at an aft end thereof, and a high pressure spool having a high pressure compressor at a forward end in fluid flow communication with the fan on said low pressure spool and a high pressure turbine at the aft end thereof, a combustor in fluid flow communication between the high pressure compressor and the high pressure turbine on said high pressure spool, a combustion gas duct between the high and low pressure turbines on said high and low pressure spools, respectively, a by-pass duct extending from the fan on said low pressure spool to a point aft of the high pressure turbine on said high pressure spool, and an alternator driven by the high pressure spool of said engine, the improvement comprising:

a plurality of circumferentially spaced poppet valves in said combustion gas duct immediately aft of the high pressure turbine on said high pressure spool; and a plurality of flow diverters connected to said poppet valves, respectively, and movable into said combustion gas duct upon opening of said valves, said poppet valves being individually openable at engine idle conditions to provide a fluid flow path from said high pressure turbine through said valves to said by-pass duct so as to increase the expansion ratio across the high pressure turbine to produce a relatively high RPM thereof at idle conditions while concomitantly reducing the expansion ratio across the low pressure turbine to reduce the speed of said low pressure spool and of the fan thereon thereby reducing air mass flow to the high pressure compressor on said high pressure spool and minimizing fuel consumption at idle speed.

2. The engine of claim 1 wherein said poppet valves have valve stems, respectively, extending radially of said engine each of which is controlled by a pneumatic diaphragm.

* * * * *